(12) United States Patent
Tamura et al.

(10) Patent No.: US 7,126,784 B2
(45) Date of Patent: Oct. 24, 2006

(54) CONCURRENT DATA RECORDING AND REPRODUCING METHOD, SEEK OPERATION CONTROL METHOD AND MAGNETIC DISK DRIVE USING THE METHODS

(75) Inventors: Tetsuya Tamura, Kanagawa (JP); Tetsuo Semba, San Jose, CA (US); Hiroshi Uchida, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/012,460

(22) Filed: Dec. 14, 2004

(65) Prior Publication Data
US 2005/0141130 A1   Jun. 30, 2005

(30) Foreign Application Priority Data
Dec. 26, 2003   (JP)   ............................. 2003-432958

(51) Int. Cl.
*G11B 5/596*   (2006.01)
(52) U.S. Cl. .................. 360/78.04; 360/71; 360/75
(58) Field of Classification Search ..................... None
See application file for complete search history.

(56) References Cited

U.S. PATENT DOCUMENTS

| | | | | |
|---|---|---|---|---|
| 5,761,692 A | * | 6/1998 | Ozden et al. ................ 711/4 |
| 5,901,009 A | | 5/1999 | Sri-Jayantha et al. | |
| 5,909,693 A | * | 6/1999 | Martini ....................... 711/114 |
| 6,301,209 B1 | * | 10/2001 | Fujinami .................. 369/47.15 |
| 6,310,743 B1 | * | 10/2001 | Haines et al. ............ 360/78.07 |
| 6,393,511 B1 | * | 5/2002 | Albrecht et al. ............... 711/4 |
| 6,442,658 B1 | * | 8/2002 | Hunt et al. ................. 711/158 |
| 6,445,531 B1 | * | 9/2002 | Gaertner et al. ......... 360/78.06 |
| 6,604,178 B1 | * | 8/2003 | Hall .......................... 711/167 |
| 2004/0022526 A1 | * | 2/2004 | Kuno et al. ................. 386/125 |
| 2004/0252609 A1 | * | 12/2004 | Kawahara ................ 369/47.28 |

FOREIGN PATENT DOCUMENTS

JP   01-245471 A   9/1989

* cited by examiner

*Primary Examiner*—Kin Wong
(74) *Attorney, Agent, or Firm*—Townsend and Townsend and Crew LLP; Patrick Duncan (57) ABSTRACT

In conventional magnetic disk drives where stream data are treated, seek operations are performed at unnecessarily high speeds. This put the magnetic disk drives at a disadvantage in suppressing noise, reducing power consumption, and lowering the costs of actuator components. In one embodiment of the invention, a magnetic disk drive comprises a magnetic disk medium; a magnetic head; a head actuator to move the magnetic head relative to the magnetic disk medium; and a controller configured to control the head actuator to move the magnetic head to record data to and reproduce data from the magnetic disk medium. The controller is configured to control the magnetic head to record stream data on the magnetic disk medium in such a manner that the stream data is recognizable as stream data. The controller is configured to detect a situation in which two or more stream data are to be recorded or reproduced concurrently so as to set a slower seek operation mode.

17 Claims, 6 Drawing Sheets

FIG. 7
701. Standby
703. Send Command and Data
705. Stream Data?
707. Normal Seek Mode?
711. Another Stream Data Present?
713. Set Eased Seek Mode
715. Execute Seek
717. Eased Seek Mode to be Continued?
719. Reset Eased Seek Mode

CONCURRENT DATA RECORDING AND REPRODUCING METHOD, SEEK OPERATION CONTROL METHOD AND MAGNETIC DISK DRIVE USING THE METHODS

CROSS-REFERENCES TO RELATED APPLICATIONS

This application claims priority from Japanese Patent Application No. JP2003-432958, filed Dec. 26, 2003, the entire disclosure of which is incorporated herein by reference.

BACKGROUND OF THE INVENTION

The present invention relates to a technique for recording/reproducing stream data in a magnetic disk drive. More particularly, the invention relates to a control method for easing the performance requirement of specific seek operations and to a magnetic disk drive using this control method.

Today, it has become part of our daily life to record/reproduce image data, particularly moving images, to/from a magnetic disk drive.

In the past, image data was usually recorded/reproduced as an analog signal to/from a magnetic tape medium by using a video recorder.

Recently, it has become relatively easy to record/reproduce images by personal computers through digital signal processing. CD, DVD, MO, optical disk drives, optomagnetic disk drives and others are being used as media and devices to record/reproduce images. Devices named HDD recorders have become popular, too.

Magnetic disk drives are convenient when used for temporary storage before image data is moved to removable media. Its features may be summarized as below:

1) Usually, the personal video recorder (hereafter abbreviated as PVR where appropriate) employs MPEG2 as the recording format.

Image data according to MEPG2 is composed of I frames obtained by compression within each frame and B and P frames which describe differences between frames.

In the PVR, when a single stream of image data is reproduced or recorded, the magnetic disk drive is accessed four to five times per second.

2) When another stream is read for fast forward replay while a stream is reproduced or recorded, it is necessary to quickly read I frames for fast forward replay while data is recorded to a continuous area four to five times per second.

3) When two stream data are recorded or reproduced semi-concurrently, accessing is substantially random.

Even when the two streams have the worst positional relation, sufficient performance is required. Meanwhile, when one stream is read for fast replay while another stream is recorded or reproduced for normal replay, the two streams requires different data transfer rates.

4) The control circuit bears a large load to semi-concurrently record/reproduce streams. Therefore, it is possible to cause a problem if an ordinary seek operation is inserted during the semi-concurrent operation.

When two stream data are recorded/reproduced, relatively long-range seek operations are done between an inner area and an outer area on the magnetic disk medium.

Since the rate of data read and transferred to the host machine is not changed depending on the seek range, it has been thought that longer-range seek operations impose harder performance requirement on the magnetic disk drive.

In this situation, the inventors have found that although long-range seek operations are done when two stream data are accessed semi-concurrently, the seek time may be set longer contrary to general belief since one of the two streams can use a high data transfer rate area (outer area on the magnetic disk).

In conventional seek profiles, the seek speed is made faster as the number of tracks to be passed or the travel distance increases although long-range seek operations necessary for concurrent recording/reproduction can be set slower than ordinary seek operations. This is not adequate in terms of noise level and power consumption.

In addition, since the magnetic disk drive, as an external storage device of a computer, is required to provide high access performance, high rigidity actuator components are used so as to move the magnetic head to a target track as fast as possible with suppressed vibrations. This makes cost reduction difficult.

There are techniques to execute a seek command in such a manner that the head is moved to the target sector of the target track not as fast as possible but as timely as possible by taking latency into consideration (just in time seek). For example, disclosed in Japanese Patent Laid-open No. 1989-245471 is this kind of technique for making seeking operations slower without the lowering the seek performance. However, this technique does not take into consideration accessing image data.

Disclosed in U.S. Pat. No. 5,901,009 is a technique for shaping the actuator control signal so as to remove sharp changes and reduce seek noise (reduced noise seek) when a seek command is executed. In that technique, the seek time is always made longer regardless of the seek length.

BRIEF SUMMARY OF THE INVENTION

In conventional magnetic disk drives to record and reproduce stream data, access patterns to image data recorded on a magnetic disk medium are not considered, which put these magnetic disk drives at a disadvantage in suppressing noise, reducing power consumption, and lowering the hardware costs of actuator components.

In accordance with an aspect of the invention, a magnetic disk drive comprises a magnetic disk medium; a magnetic head; a head actuator to move the magnetic head relative to the magnetic disk medium; and a controller configured to control the head actuator to move the magnetic head to record data to and reproduce data from the magnetic disk medium. The controller is configured to control the magnetic head to record stream data on the magnetic disk medium in such a manner that the stream data is recognizable as stream data. The controller is configured to detect a situation in which two or more stream data are to be recorded or reproduced concurrently so as to set a slower seek operation mode.

In some embodiments, the controller is configured to reset the slower seek operation mode to a previous usual seek operation mode if it has become unnecessary to concurrently record or reproduce the two stream data.

Because the seek time between two streams is set to a required and sufficient level by using a seek profile function, the seek time can be made longer than the prior techniques. This makes it possible to reduce noise, save power consumption and lower the cost of the actuator components in the magnetic disk drive.

DETAILED DESCRIPTION OF THE INVENTION

Figure 4:
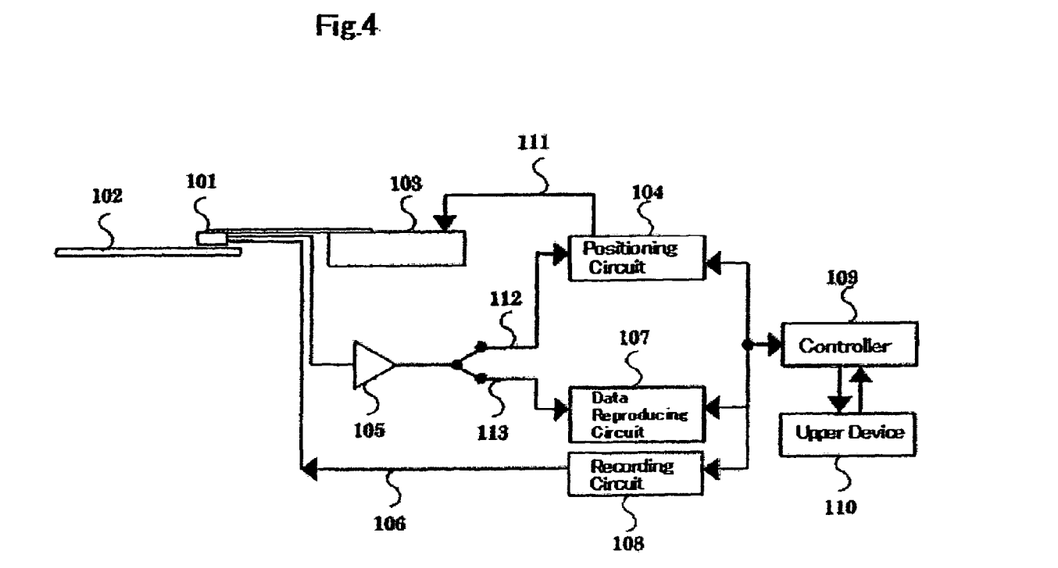
FIG. 4 is a general block diagram of a magnetic disk drive to which an embodiment of the present invention can be applied.
Figure 5:
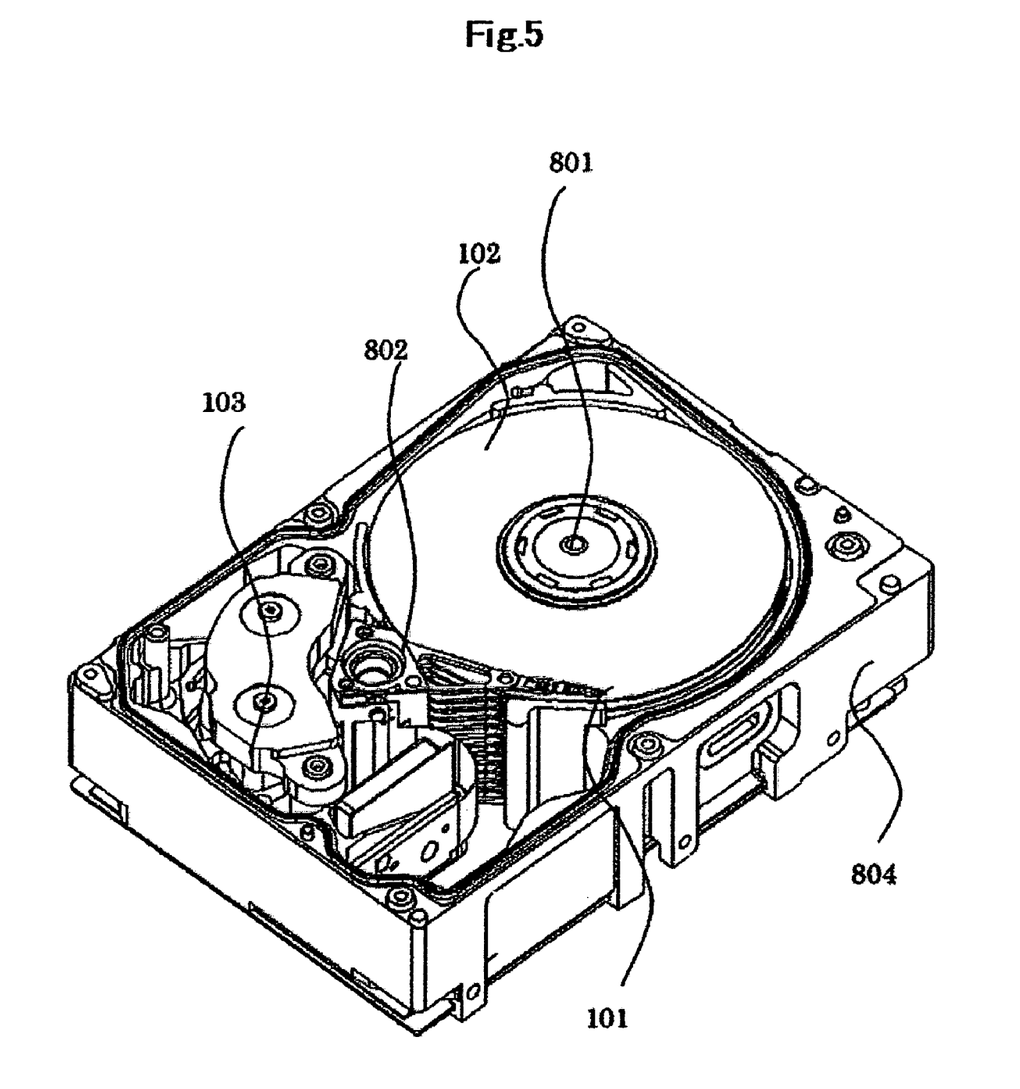
FIG. 5 is a perspective view of an example of the general construction of the magnetic disk drive.

FIG. 4 is a general block diagram of a magnetic disk drive to which an embodiment of the present invention is applicable, whereas FIG. 5 is a perspective view of an example of the overall construction of the magnetic disk drive. Reference numeral 102 denotes a magnetic disk medium; 801 denotes a spindle motor; 101 denotes a magnetic head; 103 denotes an actuator; 802 denotes a magnetic head support structure comprising head arms and other magnetic head components; and 804 denotes a sealable case. FIG. 5 illustrates the inside of the case 804 with its top cover removed.

Figure 6:
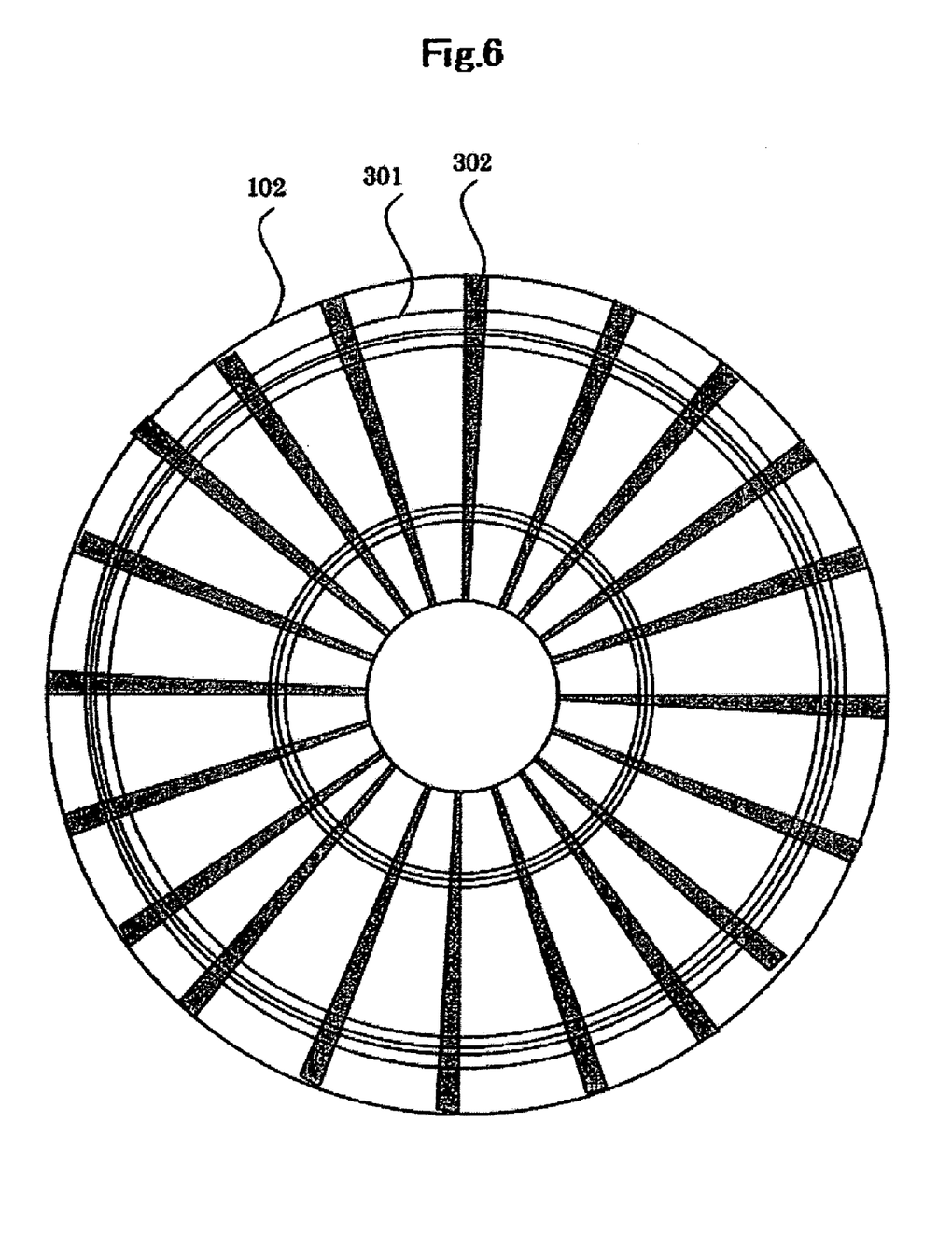
FIG. 6 shows an example of the magnetic disk medium.

The magnetic disk drive has a plurality of recording surfaces. On each recording surface, servo information to locate the magnetic head 101 at a desired position is recorded. Referring to FIG. 6 shown as an example, there are a plurality of concentric tracks 301 on a recording surface of the magnetic disk medium 102. Along each circular track, data recording segments and positional information recording segments are arranged in an intermingled manner. Each servo information recording zone 302 comprises, for example, a track number recording field to identify each track and servo information to know the deviation of the magnetic head 101 from the center of a track when the track is followed by the magnetic head 101.

In each data recording zone 301 on the magnetic disk medium 102, for example, the innermost track has 500 sectors while the outermost track has 1000 sectors. The innermost track is disadvantageous in terms of the data transfer rate. Note that the data recording segments, positional information segments, servo information recording zones, and other information must not always be arranged as shown in FIG. 6 on the recording surface of the magnetic disk medium 102.

This magnetic disk medium 102 is rotated at a constant speed by the spindle motor 801. Positional information to locate the magnetic head 101 at a desired position is retrieved by the magnetic head 101 confronting and flying above the surface of the medium 102 and sent to a controller 109 via either a positioning circuit 104 (line 112) or a data reproducing circuit 107 (line 113).

Receiving a signal from the positioning circuit 104 via line 111, the actuator 103 moves the magnetic head 101 to a target position on the magnetic disk medium 102 via the magnetic head support structure 802.

Data sent with a command from an upper device 110 is transferred through the disk controller 109 and recording circuit 108 to the magnetic head 101 located at the target position on the magnetic disk medium 102 and recorded there. When data is read, a signal detected by the read head is amplified by a head amplifier 105, demodulated by the data reproducing circuit 107 (via line 113) and transferred to the controller 109.

The controller 109 is provided with a dedicated temporary storage memory to hold information by which to update data in a sector. This temporary storage memory may be installed either within the controller or as an external memory. To prepare for power failure and other unexpected situations, the temporary storage memory should be non-volatile.

Figure 1:
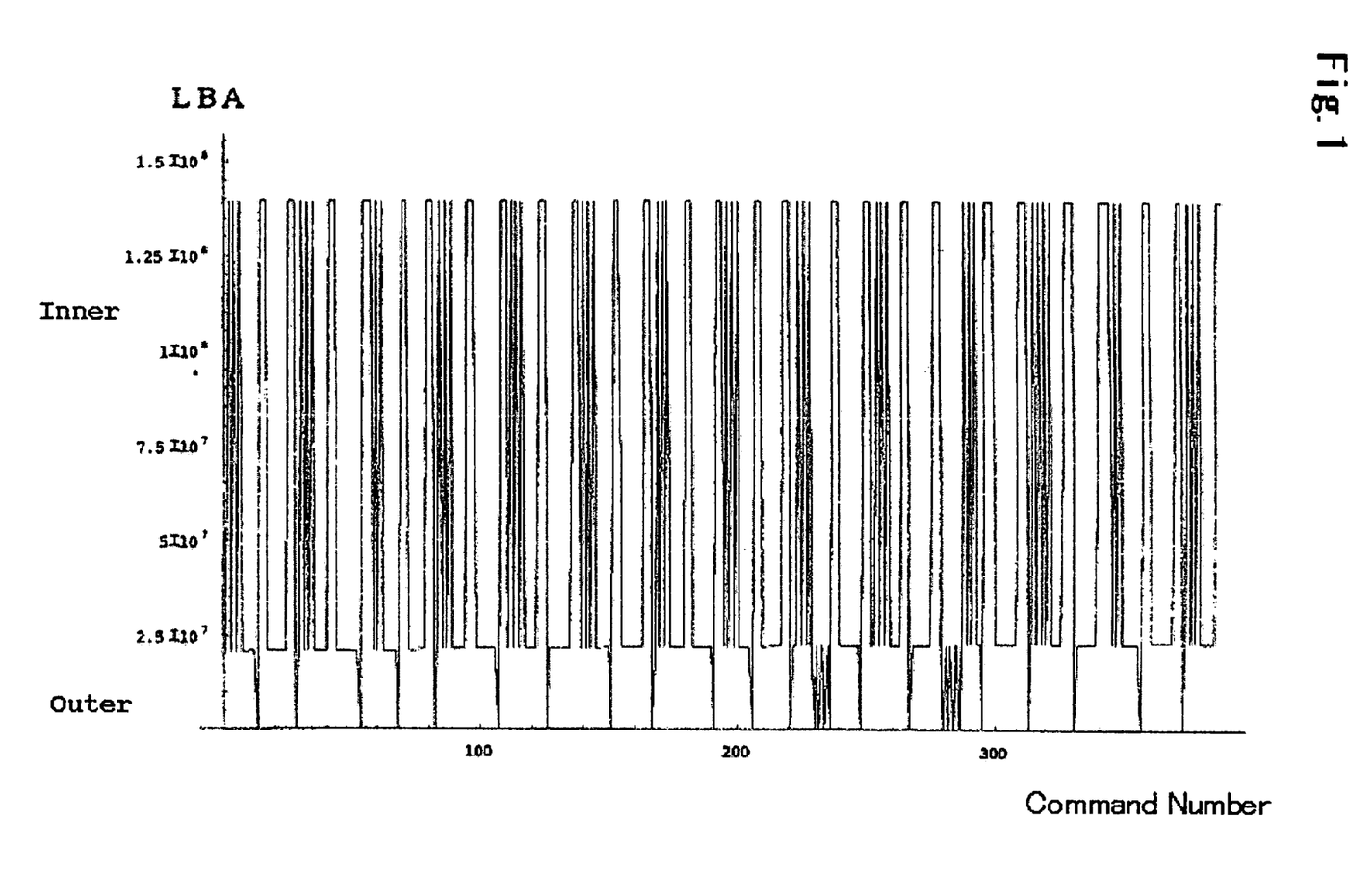
FIG. 1 shows a result of examining each LBA accessed by the magnetic head (Y axis) and the corresponding command number (X axis).
Figure 2:
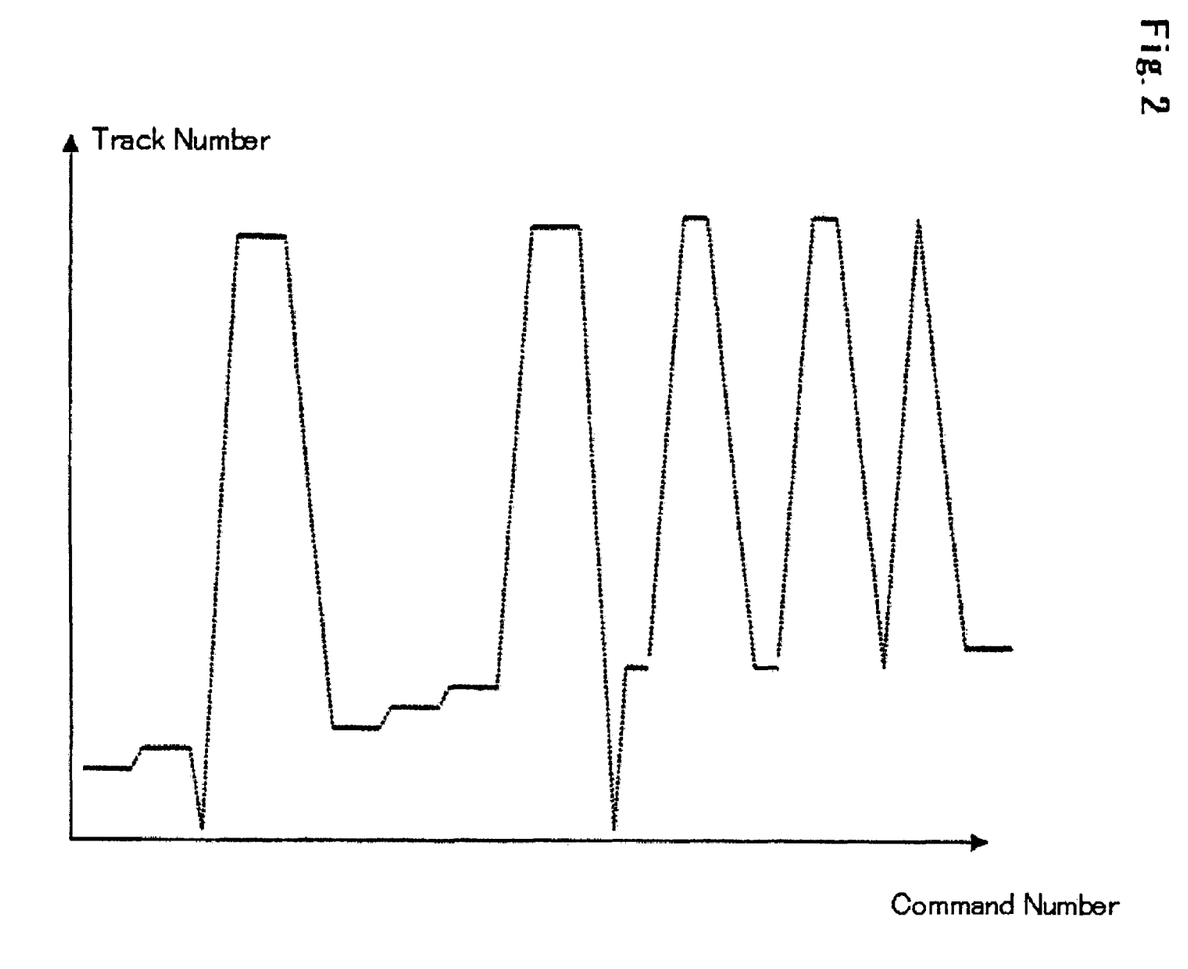
FIG. 2 is a schematic partial-enlarged diagram of FIG. 1, where the Y axis represents the track number instead of the LBA.
Figure 3:
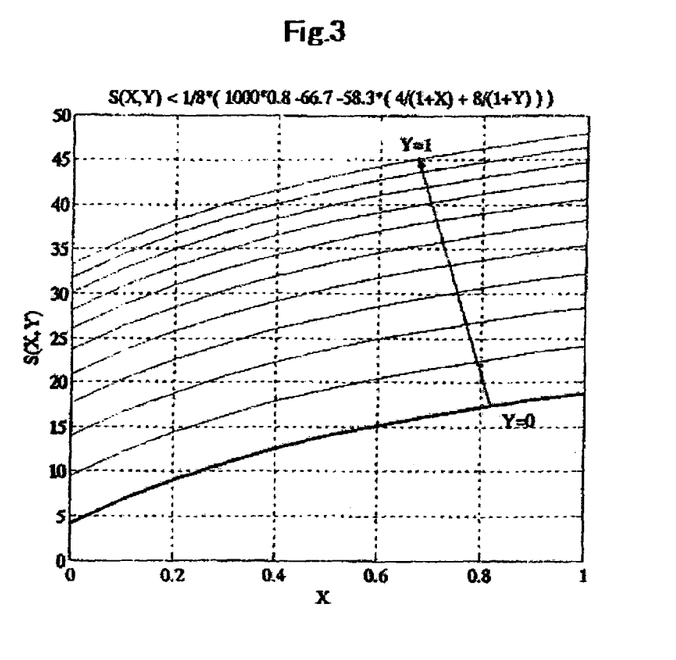
FIG. 3 is a graph indicating the upper limit of a seek profile function S (X, Y) when another stream data at location X on the magnetic disk medium is accessed while fixed location Y, for example, the innermost location (Y=0), on the medium is accessed.

With reference to FIGS. 1 to 3, the following describes the magnetic head seek method according to an embodiment of the present invention.

When a stream is replayed or recorded in a personal video recorder (PVR), accessing is done only about four or five times per second. One stream is a collection of image data sent out together with specific commands from the upper device 110 to the magnetic disk drive. The stream is received by the controller 109.

While one stream is being replayed or recorded, the access load rises or the magnetic head 101 begins to move frequently for random seek operations if trick plays, such as fast forward, fast backward and follow-up play, are done from another content (image data) stored on the same magnetic disk medium.

To reproduce or record an ordinary television program, a data transfer capacity (data rate) of 4 to 5 megabits/sec is considered necessary on average. Accordingly, some 128 kilobytes of data is read or written per access. Note that the data rate varies somewhat depending on the upper device of the magnetic disk drive.

In the fast forward or backward replay mode, the data rate must be at least twice of that in the normal replay or record mode. This is because less compressed I frames are used alone in the fast forward or backward replay mode.

In FIG. 1, each LBA (Logical Block Address) accessed by the magnetic head during the replay of stored data or the recording of new image data is plotted in relation with the corresponding command number. The X axis represents the executed command number. If sequential data is read or written, the X axis corresponds to the time axis. The Y axis represents the LBA.

In FIG. 1, the waveform has top horizontal portions where the command number increases while the Y coordinate continues to be near 1.4×the 8th power of 10. In such a portion, an image stream is continuously recorded in the magnetic disk drive (described later). In addition, the waveform has bottom horizontal portions whose Y coordinate looks unchanged from around 2.0×7th power of 10. In such a portion, another image stream is read for fast forward replay. That is, this figure indicates that while an image stream is recorded, another image stream is read for "follow-up" replay. Note that in this magnetic disk drive, the LBA starts at the outermost location (LBA=0) and ends at the innermost location (LBA=1.5×the 8th power of 10).

As apparent from FIG. 1, the command number increases faster when a stream is read for "follow-up replay" than when the other stream is recorded. That is, the magnetic head moves in the LBA space faster in the former operations than in the latter operations. Note that this holds true when either stream is sequentially recorded/reproduced.

FIG. 2 is a schematic partial-enlarged diagram of FIG. 1. Here, the Y axis represents the track number instead of the LBA. When an image data stream is written/read, data to/from a plurality of adjacent LBAs is temporally stored at a time into a cache in succession as controlled by the magnetic disk drive. By using the track number instead, the waveform is described below more consistently with the reality.

Referring to FIG. 2, a stream is recorded (written) during the top horizontal portions of the waveform. Likewise, another stream is read for replay (fast replay) during the bottom horizontal portions of the waveform. Where the waveform almost touches the horizontal axis, the magnetic head is moved to a location near the outermost track on the magnetic disk medium in order to read meta data which is used to control the magnetic disk drive and others.

The length of each horizontal portion substantially represents the quantity of written/read data since it is assumed that sequential data is written/read there. If you observe the top and bottom horizontal portions of the waveform, the following is apparent.

During fast forward replay (at the bottom of the waveform), more commands are performed. In addition, the increasing rate of the track number (moving speed of the magnetic head in the LBA space) is remarkably higher than when the other stream is recorded (at the top of the waveform).

By taking these findings into consideration, let us introduce the concept of average processing time.

Here, used in a situation in which an image stream is recorded while another image stream is read for fast forward replay, the average processing time means a time for which the replayed image stream continues having distortions or dropped frames if any. This average processing time is appropriately determined depending on specifications of the upper device of the magnetic disk drive. In the following description, it is assumed that the average processing time is required to be not longer than 1 second.

Using parameters, the average processing time is modeled as below.

$$\text{Average Processing Time} = A \times T1 + B \times T2 + 2A \times [(\frac{1}{2}) \times Trod + S(Trk1, Trk2)] \quad (1)$$

where,
A: Number of accesses per second for recording,
B: Number of accesses per second for fast forward or backward replay,
T1: Data write time per access for recording,
T2: Data read time per access for fast forward or backward replay,
Trot: Time required for the magnetic disk medium to make one revolution,
Trk1: Track number accessed for recording,
Trk2: Track number accessed for replay,
S: Seek profile function of variables Trk1 and Trk2.

The seek profile function represents the time allowed for the magnetic disk drive to seek one stream from the other stream while two streams are concurrently recorded/reproduced. This function depends on the physical positions of the two streams on the magnetic disk medium.

From the discussions so far, B>A is clear.

T1 and T2 are functions of Trk1 and Trk2, respectively. This is because the frequency of the recording signal applied to the magnetic head, the magnitude of current supplied to the magnetic pickup element, the magnitude of current biasing the magnetic pickup element, and other parameters are set depending on the target region on the magnetic recording medium.

In the above equation, the following elements are ignored:
(1) Additional seek operations if one data is divisionally treated by plural commands,
(2) Accesses to meta data and other management information as required by the file system in the magnetic disk drive, and
(3) Changing physical positional relation between the two streams as the replay/recording advances.

These should be considered as necessary if they have large influences.

The upper device, including the magnetic disk drive, requires that the average processing time is not longer than 1 second. Practically, however, a margin of about 20% (safety factor) should be allowed.

The average processing time is calculated as below.

$$T1 = T0 \times trknum/(Trk1 + trknum) = T0/(1+X), \ 0 < X < 1 \quad (2)$$

$$T2 = T0 \times trknum/(Trk2 + trknum) = T0/(1+Y), \ 0 < Y < 1 \quad (3)$$

where $T0 = 8.33$ milliseconds is assumed.

Furthermore, trknum is the total number of tracks on the magnetic disk medium and variables X and Y are obtained by normalizing Trk1 and Trk2. The values of variables X and Y are 0 at the innermost track and 1 at the outermost track. Although LBA=0 is usually mapped to the outermost location, X and Y are set so that X=0 and Y=0 means the innermost track in order to simplify the average processing time equations (2) and (3).

$T0$ is the time required to read or write stream data from or to the innermost track on the assumption that 128 kilobytes of information per access is written to or read from 512-byte sectors on the magnetic disk medium making 3600 revolutions per minute.

By substituting A=4 accesses/second, B=8 accesses/second (access frequency for fast forward replay is twice that for normal replay) and Trot=16.7 milliseconds (3600 rpm), the average processing time is calculated as below.

$$\text{Average Processing Time [milliseconds]} = 8.33 \times \{4/(1+x) + 8/(1+Y)\} + 66.7 + 8 \times S(X,Y) \quad (4)$$

If $S(X,Y) = 4.0$ [milliseconds], this results in:

$$8.33 \times 12 + 66.7 + 320 = 487 < 800 = 1000 \times 0.8$$

This average processing time is shorter than the time allowed for the replayed stream to continue having distortions or dropped frames.

The following discussion is directed to an application to HDTV (High Definition Television) streams.

If the data rate is 28 megabits/second with the same seek frequencies, $T0 = 58.3$ milliseconds on the assumption that 896 kilobytes of information per access is written/read to/from 512-byte sectors on the magnetic disk medium making 3600 revolutions per minute.

In this setting, $S(X,Y)$ is required to be:

$$S(X,Y) < (1000 \times 0.8 - 66.7 - 58.3 \times \{4/(1+x) + 8/(1+Y)\})/8 \quad (5)$$

When Y=0, S(X,Y) must satisfy the hardest requirement. For example, this corresponds to a situation where a stream to be read for fast forward replay has been recorded along the innermost track (Y=0) on the magnetic disk medium.

The innermost through outermost tracks on the magnetic disk medium are set in such a manner that the innermost track has 500 sectors whereas the outermost track has 1000 tracks. Therefore, the rate of exchanging stream data with the upper device is limited by the data rate to/from the innermost track. When Y is not 0, some easier requirement is imposed on S(X,Y).

When Y=0, S(X,Y) must satisfy the following requirement:

$$S(X,0)<(1000\times0.8-66.7-58.3\times\{4/(1+x)+8\}/8 \quad (5)'$$

This results in:

$$S(X,0)<33.36-29.15/(1+X) \quad (6)$$

FIG. 3 graphically shows this relation.

In FIG. 3, the vertical axis represents the upper limit of the seek profile function whereas the horizontal axis represents the number of the track accessed for recording. Usually, the track number starts at the innermost track (track 0) and ends at the outermost track (track N: large number). Note that in this figure, the horizontal axis is normalized by N, the track number of the outermost track and therefore does not represent the travel distance of the magnetic disk head.

The graph is drawn for several different Y values between 0 and 1.

In the case of Y=0, that is, if a stream to be read for fast forward replay has been recorded along the innermost track, the upper limit of the seek profile function (maximum allowable seek time between two streams) is determined depending on the location (X in the horizontal axis) of another stream to be recorded or replayed.

FIG. 3 is further described below.

When two streams which are radially distant from each other on a magnetic disk medium are accessed semi-concurrently, long-range seek operations are done. Contrary to general belief, in this case, since one of the two streams uses a high data rate region (outer region on the magnetic disk medium), the seek speed is allowed to be slower than short-range seek operations.

In conventional magnetic disk drives, when two streams which are radially distant from each other on a magnetic disk medium are accessed semi-concurrently, accessing is made by the "high-speed seek according to the seek range+ following (standby on the target track)" method. This causes larger seek noise and larger power consumption and requires higher rigidity actuator components as compared with magnetic disk drives implemented according to an embodiment of the present invention.

Applying an embodiment of the present invention makes it possible to allow longer time for long-range seek operations.

For example, in the case of a common magnetic disk drive with an average seek time of 10 milliseconds, its mechanical system including the actuator components may have resonance peaks between 3 kHz and 4 kHz. If the present embodiment is applied to this magnetic disk drive, the full-track seek may be done in as long as 20 milliseconds. As a result, since the magnetic head settles at the target tracks more smoothly, mechanical components are made freer from vibration and noise problems and therefore lower cost mechanical components can be used.

When an eased seek mode is executed according to FIG. 3, servo control may be done as described below.

Based on the fact that changing the acceleration or deceleration of the actuator by k % approximately changes the seek time by its square root, necessary acceleration change ratios are predetermined by using the relations shown in FIG. 3. The determined values may be recorded either on the magnetic disk medium or in a non-volatile memory.

A variety of methods can be used to determine the change ratios. In one example, the change ratios are determined according to polynomial expressions which approximate the relations of FIG. 3. Another method is to divide the plural tracks on the magnetic disk medium into several regions, approximate region-to-region relations by polynomial expressions, and estimate track-to-track relations by means of interpolation. In either case, linear expressions may be used instead of polynomials since close approximation is not necessary.

To decrease the acceleration of the actuator by k %, the maximum acceleration is obtained with the actuator control signal whose level is reduced by k % and the decelerating velocity profile is reduced by k %. This extends the seek time to a required and sufficient level, resulting in suppressed vibrations and noises caused by the operating actuator. In addition, the same result can also be attained by limiting the maximum seek velocity of the actuator.

Figure 7:
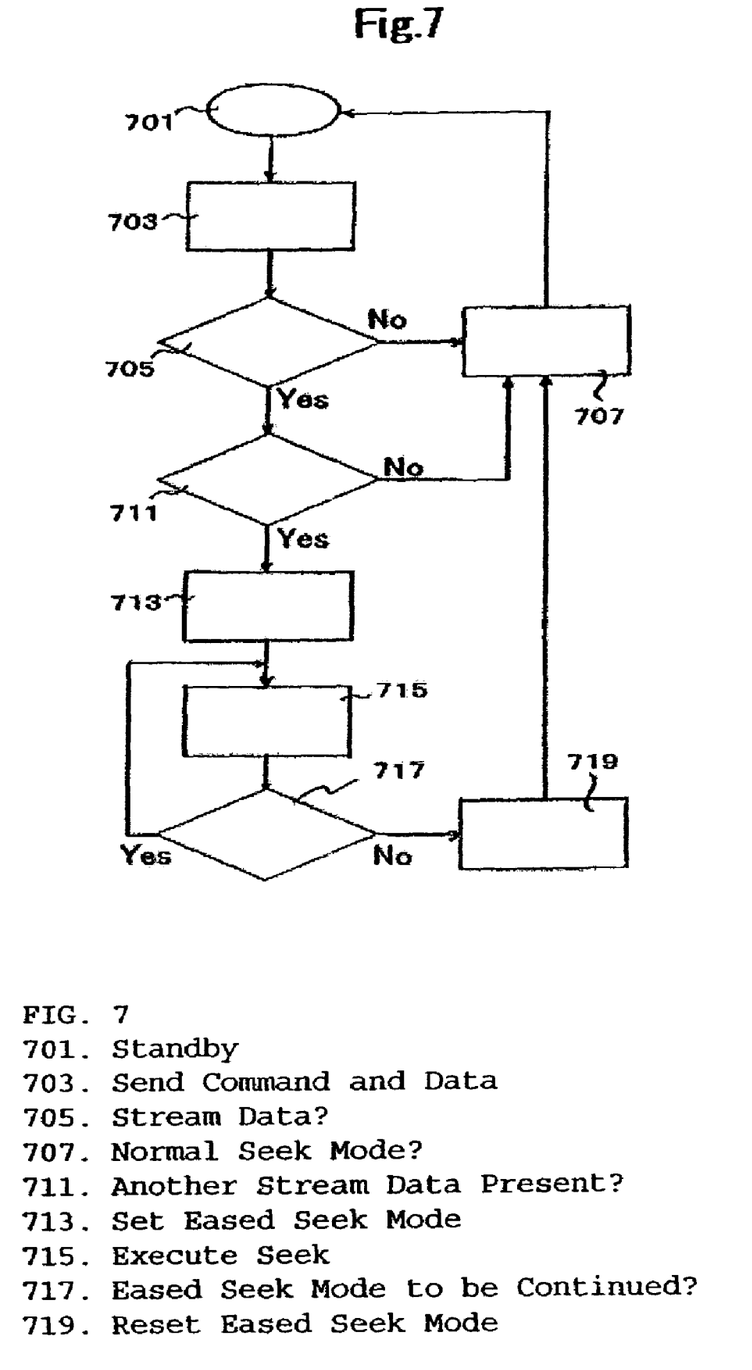
FIG. 7 is a flowchart indicating how to set and reset an eased seek mode according to an embodiment of the invention.

Then, FIG. 7 is a flowchart indicating how to set and reset an eased seek mode according to an embodiment of the invention.

Note that although data is recognized by the controller 109 as stream data according to the information sent from the upper device and the subsequent sequence of operations are also done by the controller 109, not only the sequence of operations may all or partly be executed by another electronic circuit but also the data stream recognition may be performed by another mechanism.

At first, the magnetic disk drive that is interoperably connected with the upper device goes into the standby state (Step 701). From the upper device, a command is sent together with data to the magnetic disk drive (Step 703). Depending on the upper device, there may be no distinction between the data and the command.

The controller 109 of the magnetic disk drive judges whether the sent data is stream data or not according to the AV command format defined by the ATA-7 or some other command format or the data format (Step 705). If an AV command is used, the controller 109 recognizes the stream ID information and stores it in a predetermined memory area.

If the data is not judged as stream data in Step 705 (No), the controller 109 verifies that the magnetic disk drive is in the normal seek mode and, if not, sets the normal seek mode (Step 707). Then, it executes the command and returns to the standby state (Step 701).

If the data is judged as stream data in Step 705 (Yes), the controller judges whether or not another stream to be written or read is present (Step 711). If such a stream is not present (No), the controller 109 returns to Step 707. If present (Yes), the controller 109 advances to Step 713.

The controller 109 sets these two streams as a pair and creates an eased seek mode for the pair by referring to a seek profile stored previously in a table (Step 713).

In a situation where n (n>2: natural number) stream data, that is, three or more stream data are to be treated, the controller 109 sets possible stream pairs among the n stream data and assigns eased seek modes respectively to the pairs in advance (Step 713). If the controller 109 has high computing performance, it may be possible to immediately create and assign an eased seek mode to any pair according to relational expressions (such as shown in FIG. 3) in a ROM upon receipt of the relevant command from the upper device.

Then, the controller 109 executes a seek operation between two stream data constituting the pair in the eased seek mode assigned to the pair (Step 715). Thereafter, the controller 109 checks if either stream data of the pair is yet to be written/read (Step 717). If either stream data must continue to be written/read (Yes), the controller 109 returns to Step 715.

If neither stream data must continue to be written/read (No), the controller 109 dissolves the stream data pair and cancels the eased seek mode assigned to the pair (Step 719). Then, the controller 109 returns to Step 707. If all pairs are dissolved, the controller 109 returns to the standby state (Step 701) after setting the normal seek mode and executing the command.

The controller 109 is provided with the capability to cancel the stream data-related settings and pairings so as to return to the normal seek mode in response to a predetermined interrupt signal from the upper device in case of emergency.

The present embodiment is applicable to a magnetic disk drive in which image data, particularly moving image data should be recorded/reproduced with low noise and low power consumption.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
a magnetic disk medium;
a magnetic head;
a head actuator to move the magnetic head relative to the magnetic disk medium; and
a controller configured to control the head actuator to move the magnetic head to record data to and reproduce data from the magnetic disk medium;
wherein the controller is configured to control the magnetic head to record stream data on the magnetic disk medium in a stream data format; and
wherein the controller is configured to detect a situation in which two or more stream data are to be recorded or reproduced concurrently so as to set a slower seek operation mode;
wherein the controller is configured to use an AV command defined by an ATA-7 to record the stream data on the magnetic disk medium in a stream data format.

2. The magnetic disk drive according to claim 1 wherein the controller is configured to reset the slower seek operation mode to a previous seek operation mode if any two of the two or more stream data are not recorded or reproduced concurrently.

3. The magnetic disk drive according to claim 1 wherein the controller is configured to reset the slower seek operation mode to a previous seek operation mode in response to an interrupt signal from a host system.

4. The magnetic disk drive according to claim 1 wherein the controller is configured to set the slower seek operation mode by referring to a previously stored seek profile which represents a time allowed for the magnetic disk drive to seek one stream from another stream of the streams that are concurrently recorded or reproduced.

5. The magnetic disk drive according to claim 1 wherein the controller is configured to judge whether information received from a host system is stream data or not.

6. The magnetic disk drive according to claim 1 wherein the controller is configured to execute seek operations in the slower seek operation mode in the situation in which two or more stream data are to be recorded or reproduced concurrently.

7. The magnetic disk drive according to claim 1 wherein the controller is configured, in recording first stream data on the magnetic disk medium while reproducing second stream data which has been recorded on the magnetic disk medium, to set a seek time shorter when the first stream and second stream are respectively recorded to and reproduced from an innermost area of the magnetic disk medium than when the first stream and second stream are respectively recorded to and reproduced from an outermost area of the magnetic disk medium.

8. A method of controlling a head actuator to move a magnetic head relative to a magnetic disk medium to record data to and reproduce data from the magnetic disk medium, the method comprising:
controlling the magnetic head to record stream data on the magnetic disk medium in a stream data format; and
detecting a situation in which two or more stream data are to be recorded or reproduced concurrently so as to set a slower seek operation mode;
wherein the stream data is recorded on the magnetic disk medium using an AV command defined by an ATA-7 in a stream data format.

9. The method according to claim 8 further comprising:
resetting the slower seek operation mode to a previous seek operation mode if any two of the two or more stream data are not recorded or reproduced concurrently.

10. The method according to claim 8 further comprising:
resetting the slower seek operation mode to a previous seek operation mode in response to an interrupt signal from a host system.

11. The method according to claim 8 further comprising, upon detecting the situation in which two or more stream data are to be recorded or reproduced concurrently:
setting the slower seek operation mode by referring to a previously stored seek profile which represents a time allowed for the magnetic disk drive to seek one stream from another stream of the streams that are concurrently recorded or reproduced.

12. The method according to claim 8 further comprising: judging whether information received from a host system is stream data or not.

13. The method according to claim 8 further comprising: executing seek operations in the slower seek operation mode in the situation in which two or more stream data are to be recorded or reproduced concurrently.

14. The method according to claim 8 further comprising, in recording first stream data on the magnetic disk medium while reproducing second stream data which has been recorded on the magnetic disk medium:
setting a seek time shorter when the first stream and second stream are respectively recorded to and reproduced from an innermost area of the magnetic disk medium than when the first stream and second stream are respectively recorded to and reproduced from an outermost area of the magnetic disk medium.

15. A recording and reproducing method for recording first stream data on a recording medium while reproducing second stream data which has been recorded on the recording medium, the method comprising:

setting a seek time shorter when the first stream and second stream are respectively recorded to and reproduced from an innermost area of the recording medium than when the first stream and second stream are respectively recorded to and reproduced from an outermost area of the recording medium; and concurrently recording the first stream data on and reproducing the second stream data from the recording medium using the seek time;

wherein the first and second stream data are recorded on the recording medium using an AV command defined by an ATA-7 in a stream data format.

16. A method for controlling a seek operation in a magnetic disk drive when the magnetic disk drive recognizes information sent from a host device as stream data and concurrently accesses two or more stream data including the stream data sent from the host device; the method comprising:

setting the magnetic disk drive which is interoperably connected to the host device into a standby state;

judging whether the information sent from the host device is stream data;

if the information is judged as stream data, finding other stream data that are to be recorded or reproduced;

if two or more other stream data are to be recorded or reproduced, pairing the stream data from the host device with one of the stream data found and assigning a slower seek mode to the pair;

executing seek operations in the slower seek mode between the two stream data constituting the pair; and recording the stream data on a magnetic disk medium using an AV command defined by an ATA-7 in a stream data format.

17. The method according to claim 16 further comprising:

resetting the slower seek operation mode to a previous seek operation mode, if any two of the two or more stream data are not recorded or reproduced concurrently, or in response to an interrupt signal from the host device.

* * * * *